US012058504B2

(12) United States Patent
King et al.

(10) Patent No.: US 12,058,504 B2
(45) Date of Patent: Aug. 6, 2024

(54) LOUDSPEAKER FOR HEARING DEVICE

(71) Applicant: Knowles Electronics, LLC, Itasca, IL (US)

(72) Inventors: Charles Bender King, Oak Park, IL (US); Mekell Jiles, Flossmoor, IL (US); Christopher A Jones, Carpentersville, IL (US); Evan Llamas-Young, Algonquin, IL (US)

(73) Assignee: Knowles Electronics, LLC, Itasca, IL (US)

( * ) Notice: Subject to any disclaimer, the term of this patent is extended or adjusted under 35 U.S.C. 154(b) by 139 days.

(21) Appl. No.: 17/813,923

(22) Filed: Jul. 20, 2022

(65) Prior Publication Data

US 2024/0031741 A1 Jan. 25, 2024

(51) Int. Cl.

| | |
|---|---|
| ***H04R 13/00*** | (2006.01) |
| ***H04R 1/10*** | (2006.01) |
| ***H04R 7/20*** | (2006.01) |
| ***H04R 9/02*** | (2006.01) |

(52) U.S. Cl.
CPC ............... *H04R 9/025* (2013.01); *H04R 1/10* (2013.01); *H04R 7/20* (2013.01)

(58) Field of Classification Search
CPC . H04R 1/10; H04R 7/00; H04R 13/00; H04R 7/04; H04R 11/02
USPC ................................ 381/342, 347, 186, 417
See application file for complete search history.

(56) References Cited

U.S. PATENT DOCUMENTS

| | | | | |
|---|---|---|---|---|
| 8,223,996 B2 | 7/2012 | Beekman et al. | | |
| 2016/0198267 A1* | 7/2016 | Jiles | ....................... | H04R 11/08 381/398 |
| 2020/0389735 A1* | 12/2020 | Yu | ............................ | H04R 7/20 |

OTHER PUBLICATIONS

Mohammadi et al., U.S. Appl. No. 17/404,902, "Dual-Diaphragm Moving-Coil Audio Transducer for Hearing Device", filed Aug. 17, 2021.

Mohammadi et al., U.S. Appl. No. 18/058,095, "Loudspeaker for Hearing Device", filed Nov. 22, 2022.

* cited by examiner

*Primary Examiner* — Disler Paul

(74) *Attorney, Agent, or Firm* — Loppnow & Chapa; Matthew C. Loppnow

(57) ABSTRACT

A loudspeaker for hearing devices including a diaphragm arranged in a housing to form a back volume and a front volume acoustically coupled to a sound port is disclosed. A surface of a first magnet in the front volume faces an opposing surface of a second magnet in the back volume, and the opposing surfaces of the magnets are separated by a gap and have the same magnetic polarity. An electrical coil assembly coupled to the diaphragm has a radial difference dimension to thickness dimension ratio greater than 1, wherein the diaphragm and the electrical coil assembly are movable in the gap between the magnets in response to an electrical audio signal applied to the electrical coil assembly.

20 Claims, 5 Drawing Sheets

LOUDSPEAKER FOR HEARING DEVICE

FIELD OF THE DISCLOSURE

The present disclosure relates generally to loudspeakers for use in hearing devices and other body-worn audio devices.

BACKGROUND

Sound-producing acoustic speakers are commonly used wired and wireless earphones, True Wireless Stereo (TWS) devices and in hearing aids, among other hearing devices. In many non-prescription (commercial) hearing devices, the loudspeaker is implemented as a moving-coil (dynamic) speaker. Some hearing devices include a combination of dynamic speakers and one or more balanced armature receivers optimized for different parts of the frequency spectrum. Other devices, like in-ear monitors, include a combination of balanced armature receivers with or without a dynamic speaker. Dynamic speakers are not widely used in prescription hearing devices due in part to their large size and inefficiency compared to balanced armature receivers. In these and other hearing device applications, speaker size, efficiency, performance and cost are paramount considerations. Thus there is an ongoing need for improvements in loudspeakers suitable for use in both prescription and non-prescription hearing devices, among other body-worn audio devices.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described and that some of the steps or acts may be performed concurrently unless specified otherwise. The terms and expressions used herein have the meaning understood by those of ordinary skill in the art except where different meanings are attributed to them herein.

DETAILED DESCRIPTION

The disclosure relates generally to loudspeakers suitable for use in hearing devices worn in or partially in a user ear canal or in or on the user's ear, among other body-worn devices. Such hearing devices include prescription hearing aids including but not limited to In-the-Ear (ITE) devices, Receiver-in-Canal (RIC) devices, In-the-Canal (ITC) devices, completely-in-canal (CIC) devices, and implantable medical devices, among others. Non-prescription hearing devices include but are not limited to sound amplifiers, wired and wireless earphones, ear buds, and studio monitors, among other in-ear and on-the-ear hearing devices. The loudspeakers disclosed herein can also be used in other body-worn devices, like over-the-ear head phones. Loudspeakers suitable for use in these and other hearing devices are referred to herein as "wearable loudspeakers".

According to one aspect of the disclosure, a loudspeaker comprises a diaphragm separating an interior of a housing into a back volume and a front volume coupled to a sound port between the front volume and an exterior of the housing. The loudspeaker also comprises an electrical coil assembly coupled to the diaphragm. A ratio of a radial difference dimension of the electrical coil assembly to a thickness dimension of the electrical coil assembly is greater than 1. Such an electrical coil assembly is also referred to herein as a "flat-coil". A gap separates a first magnet located in the front volume from a second magnet located in the back volume wherein opposing surfaces of the first and second magnets have the same magnetic polarity. An electrical audio signal applied to the electrical coil assembly moves the diaphragm and the electrical coil assembly in unison in the gap between the first and second magnets, wherein the vibrating diaphragm and electrical coil assembly emit sound from the sound port via the front volume.

Figure 1:
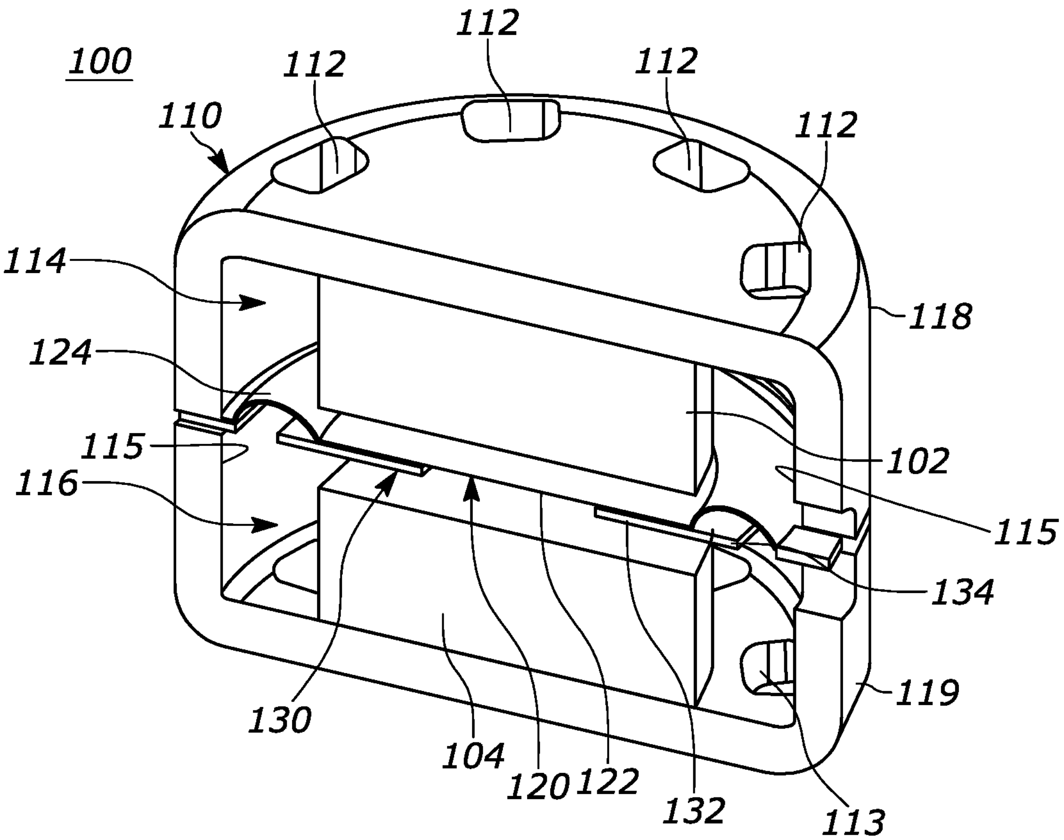
FIG. 1 is an isometric sectional view of flat-coil loudspeaker.
Figure 3:
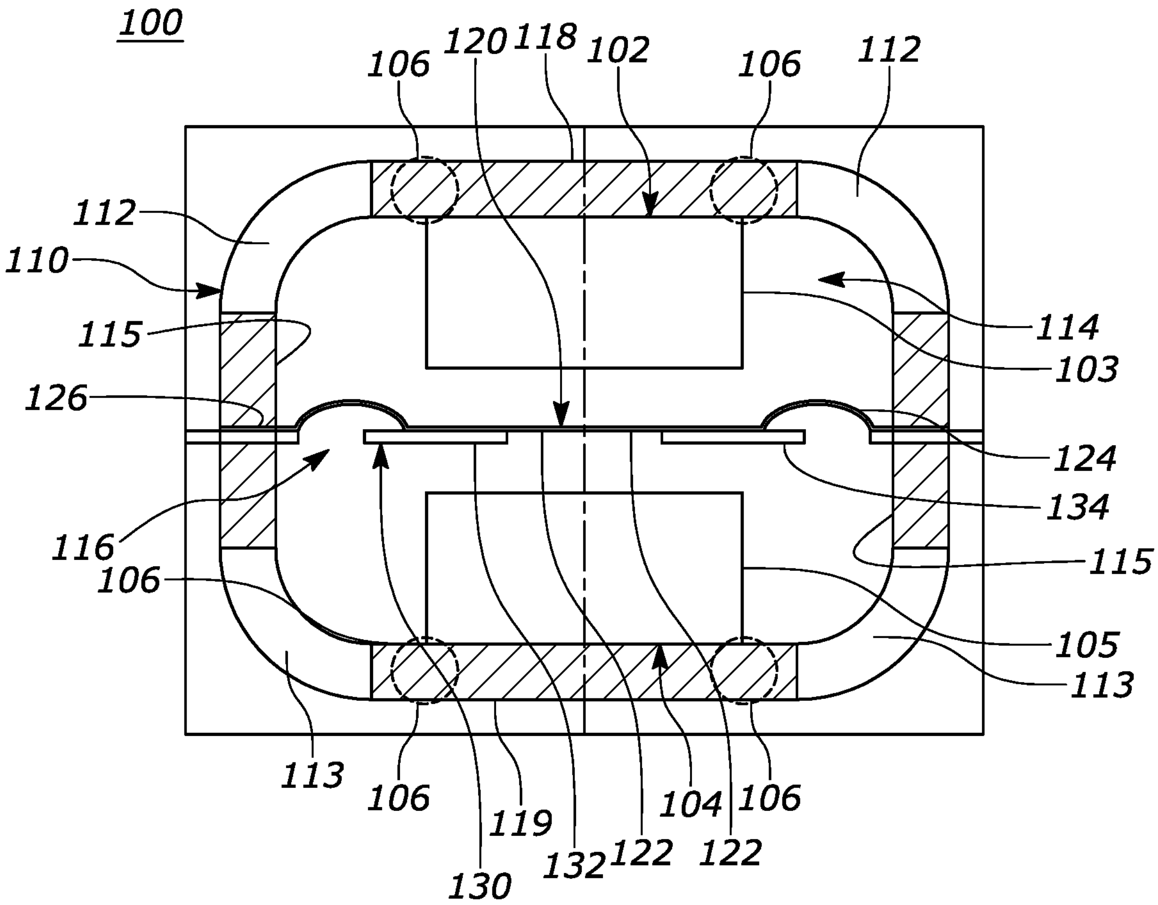
FIG. 3 is a schematic sectional view of a flat-coil loudspeaker.

In FIGS. 1 and 3, the loudspeaker 100 includes a cylindrical housing 110 having one or more sound ports 112 acoustically coupled to a front volume 114. A diaphragm 120 separates the front volume from a back volume 116. In FIGS. 1 and 3, the back volume is vented to an exterior of the housing by one or more optional vents 113. The back volume vents can be acoustically coupled to an interior of a host device or directly to the atmosphere. The vented back volume can improve low frequency response, particularly in loudspeakers where the back volume is not much larger than the front volume. In other implementations however the back volume can be sealed. Also, the front and back volumes shown in FIGS. 1 and 3 can be reversed, wherein the interior volume 114 can be the back volume without or without vents, and the interior volume 116 can be the front volume coupled to one or more sound ports. In some implementations, a nozzle can be fastened to an outer surface of the housing and covering the one or more sound ports between the front volume and an exterior of the housing.

Figure 2:
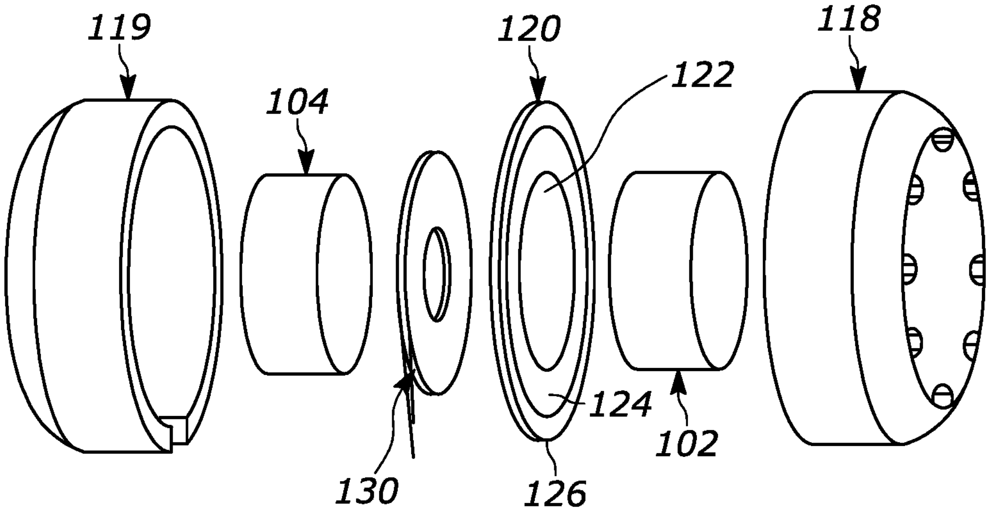
FIG. 2 is an exploded view of the loudspeaker of FIG. 1.

The housing can comprise a soft magnetic material and can be an assembly of multiple housing portions. In FIGS. 1-3, the representative housing comprises first and second mating housing portions 118 and 119 each having a symmetrical cup-shape. Alternatively, the housing portions can be asymmetrical. For example, the housing can comprise multiple asymmetrical cups, or the housing can comprise a single cup mounted on a flat plate. In another implementation, the housing comprises a closed sidewall with open ends covered by corresponding plates or cup portions. The representative housing in FIGS. 1 and 2 is cylindrical. In other embodiments, however, the housing can have a cube, rectangular cuboid, oval, or other shape.

Figure 4:
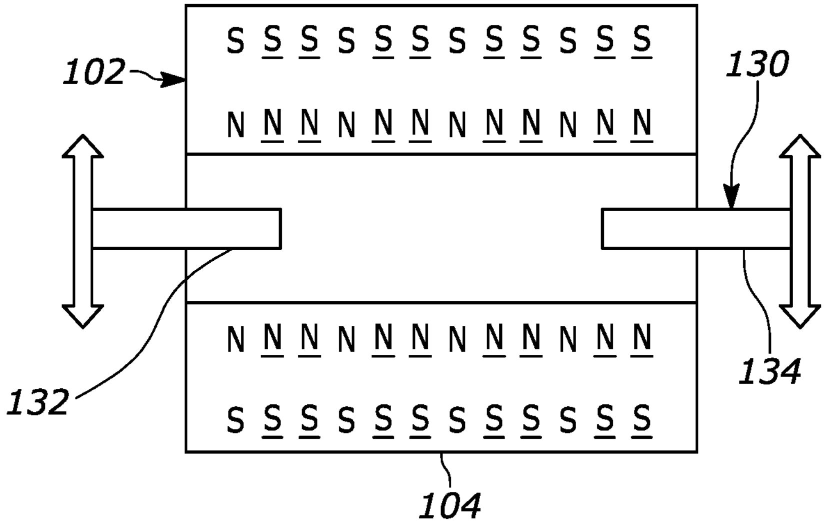
FIG. 4 is a partial schematic view of a flat-coil loudspeaker motor.

The loudspeaker also comprises a first magnet disposed in and retained by a portion of the housing partially defining the front volume and a second magnet disposed in and retained by a portion of the housing partially defining the back volume. Opposing surfaces of the first and second magnets are spaced apart by a gap. The opposing surfaces of the first and second magnets have the same magnetic polarity, as shown in FIG. 4. In FIGS. 1 and 3, a first cylindrical magnet 102 is fastened to an endwall of the first housing portion 118 partially defining the front volume, and a second cylindrical magnet 104 is fastened to an endwall of second housing portion 119 partially defining the back volume. The first and second magnets are aligned on opposing sides of the electrical coil assembly within the housing. The magnets can be fastened to the housing by welds or other means. Thus configured, the housing can constitute part of a DC magnetic circuit for magnetic fields produced by the first and second magnets.

The magnets have substantially the same, size, shape and magnetic field strength to provide opposing magnetic fields that force flux to travel away from the center of the structure. A symmetrical configuration and arrangement of the magnets and coil assembly can improve the efficiency of the loudspeaker. In FIGS. 1-3, the magnets are cylindrical like the housing. Cubic, rectangular cuboid, and oval housings can have magnets with a cubic, rectangular cuboid, or oval shape, respectively. Magnets having the same shape as the housing optimize space usage. Alternatively, the magnets can have a different shape than the housing. In FIGS. 1 and 3, an outer diameter of the magnets 102, 104 is less than an inner diameter of the cylindrical housing 110. Thus there is a space between the housing sidewall 115 and sidewalls 103, 105 of the first and second magnets. In other embodiments the outer diameter of the magnets is the same as the inner diameter of the cylindrical housing and there is no space between the housing sidewall and magnets. In one implementation, the magnets have a magnetic field strength sufficiently strong to create a magnetic flux density greater than 1.5 Tesla in portions 106 of the housing where the sidewalls 103, 105 of the first and second magnets meet the housing. The magnets can comprise a rare earth element like Neodymium or other known or future material suitable for acoustic transducers.

The loudspeaker comprises a diaphragm is located in the gap between the first and second magnets. The diaphragm is sized and shaped to separate the interior of the housing into a front volume and a back volume. The diaphragm generally comprises a membrane and a flexible surround at least partially bridging space between the membrane and a sidewall of the housing. In some embodiments, a portion of the electrical coil assembly also constitutes part of the diaphragm in lieu of the membrane or in combination with the membrane and the flexible surround, as described further herein. A stiffness of the membrane can be selected to for a desired resonance or to prevent undesirable resonance. Membrane stiffness can be provided by appropriate selection of the material from which the membrane is formed or by structural features, like one or more ribs, formed on the membrane. The flexible surround permits the membrane to vibrate in the gap between the first and second magnets. The flexible surround is coupled directly or indirectly to an outer peripheral portion of the membrane. The flexible surround is also coupled directly or indirectly to the housing. Representative examples are described further herein.

The membrane and flexible surround can be formed as a unitary member or can be an assembly of separate components formed of like or different materials. The membrane can be cellulose paper, polymer, silicone, metal or a composite material like carbon fiber, among other known or future materials. Representative polymers include urethane, polyether ether ketone (PEEK), polyethylene naphthalate (PEN), polyethylene terephthalate (PET), and polyethylenimine (PEI), among others. Combinations of these and other materials can be used. The surround can be same material as membrane or can be a foam, rubber, resin-coated fabric, among other known and future materials that permit movement and re-centering of the membrane in the gap between the magnets.

In FIGS. 1-3, an annular diaphragm 120 comprises a disk-shaped membrane 122 and an annular flexible surround 124 coupled directly to an outer peripheral portion of the membrane. In other embodiments, the diaphragm can have a square or rectangular shape for use in a cube-shaped housing, oval housing, or a rectangular cuboid housing, respectively, among other shapes. The flexible surround is also coupled to the housing 110.

An outer portion of the diaphragm is fastened to the housing. For example, the flexible surround or some other portion of the diaphragm can be coupled directly or indirectly to the housing. In some implementations, the diaphragm includes a ring coupled to a peripheral portion of the flexible surround and the ring is coupled to the housing. The ring generally has the same peripheral shape as the flexible surround. As shown best in FIGS. 3 and 5, the annular diaphragm comprises an annular ring 126 disposed about and fastened to an outer peripheral portion of the flexible surround. The ring can extend from the flexible surround and can be coupled directly or indirectly to the housing. In FIGS. 1 and 3, the ring 126 is located between and retained by mating portions of the first and second cups 118, 119. In some implementations, the ring is supported by a spacer, described further below. Alternatively, the ring can be a rigid member located between and retained by the mating portions of the housing without a supporting spacer. In other implementations, the diaphragm can be supported by other diaphragm mounting schemes. For example, the ring with or without the spacer, can be supported on and retained by inwardly extending portions of the housing sidewall formed by partial perforations through the sidewall, among other structures. The ring can comprise the same material as the rigid membrane or other materials depending on the desired pliability. Alternatively, the ring can be flexible and comprise the same material as the flexible surround, among other flexible materials. A flexible ring can be coupled directly to the housing or be supported by some other structure fastened to the housing as described further herein.

The loudspeaker also comprises an electrical coil assembly fastened directly or indirectly to the diaphragm and at least partially located in the gap between the first and second magnets. The diaphragm and electrical coil assembly move in unison in the gap between the first and second magnets in response to the electrical audio signal applied to the electrical coil assembly. The electrical coil assembly can be fastened directly or indirectly to the diaphragm by an adhesive or other fastening mechanism. The first and second magnets can be aligned symmetrically with the electrical coil assembly for optimal performance. The electrical coil assembly minimally comprises an insulated wire, like varnished copper, wound into a coil form. The electrical coil can have the same shape as the magnets and can have a round, oval, square or rectangular among other outer perimeter shapes depending on the shape of the loudspeaker.

Figure 6A:
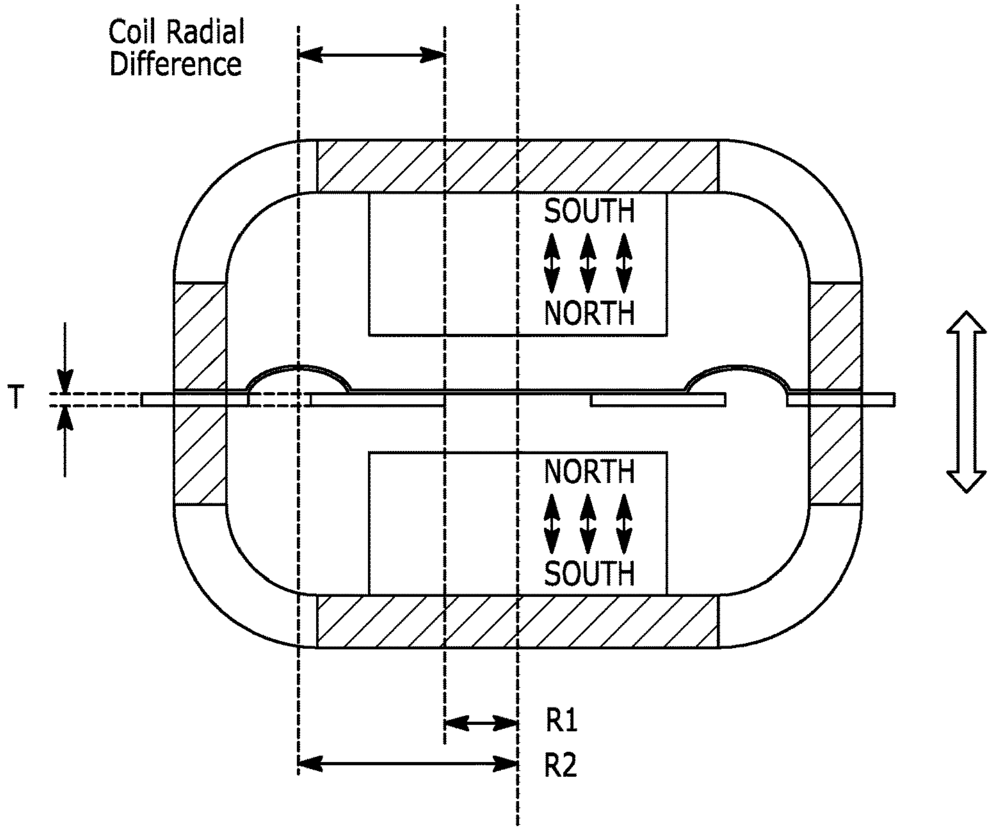
FIG. 6A is a schematic showing a thickness dimension T and a radial difference dimension of an electrical coil assembly.
Figure 6B:
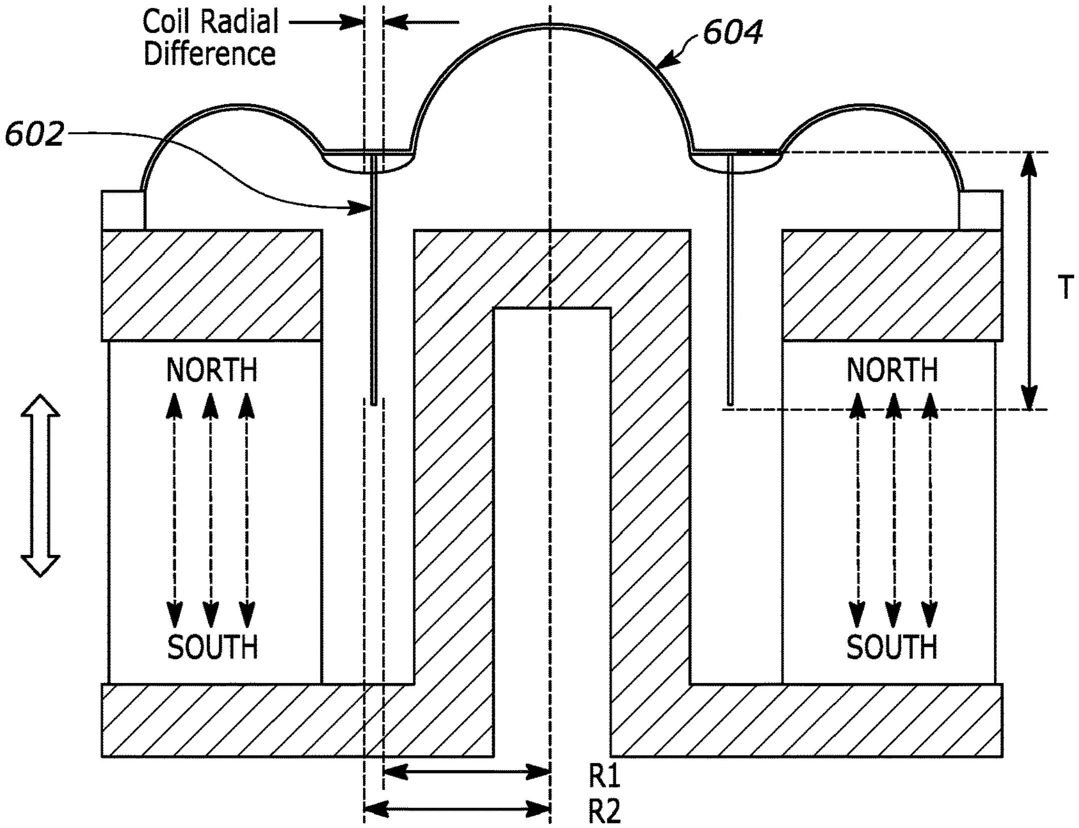
FIG. 6B (PRIOR ART)
FIG. 6B is a schematic showing a thickness dimension T and a radial difference dimension of a prior art electrical coil assembly.

The electrical coil assembly has a thickness dimension T and a radial difference dimension defined as $R_{DIF}=R_2-R_1$ where $R_2$ is an outermost radius of the coil and $R_1$ is an innermost radius of the coil, as shown in FIG. 6A. In contrast, FIG. 6B shows a thickness dimension T and a radial difference dimension of a prior art electrical coil assembly 602 connected to a prior art diaphragm 604. A ratio of the radial difference dimension to the thickness dimension (RDIF/T) is greater than 1. Thus configured, the diaphragm and the electrical coil assembly of the flat-coil loudspeaker are movable in unison in the gap between the first and second magnets in response to an electrical audio signal applied to the electrical coil assembly. In some coil assemblies the coil is wound about a bobbin. In other implementations, the weight of the electrical coil assembly can be reduced by eliminating the bobbin. Additionally, resonances of the diaphragm can be controlled by eliminating the bobbin or through appropriate selection of the bobbin material.

Figure 5:
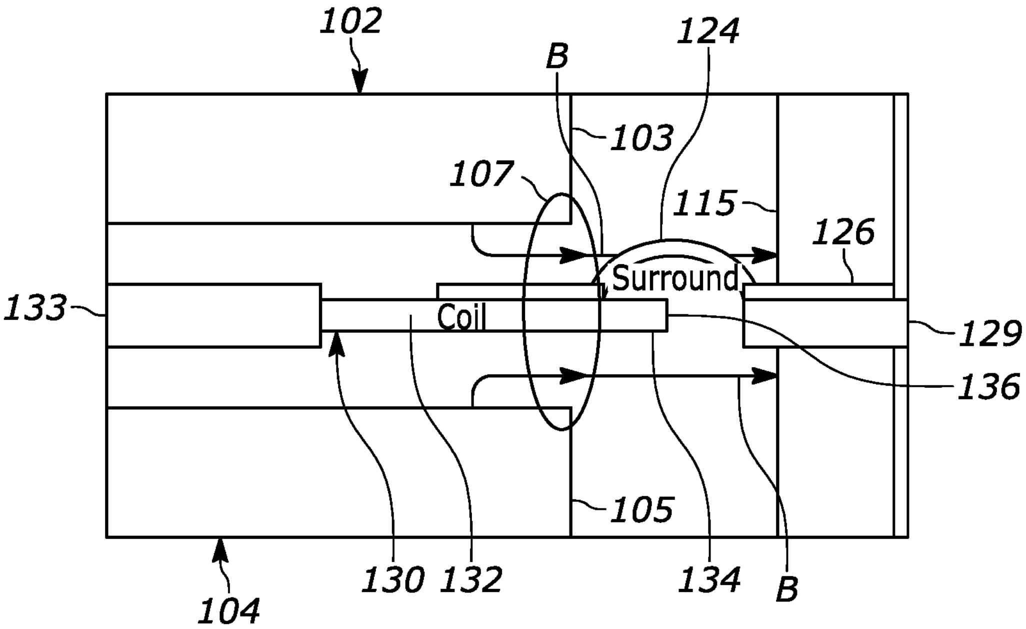
FIG. 5 is a partial schematic view of the flat-coil loudspeaker.

In FIGS. 1, 3 and 5, the loudspeaker comprises an annular electrical coil assembly 130 comprising a coil coupled to the diaphragm 120 and located in the gap between the first and second magnets 102, 104. An inner radial portion 132 of the electrical coil assembly is located in the gap between the first and second magnets 102, 104, as shown best in FIGS. 1 and 3-5.

In FIG. 5, a radial component B of the magnetic field interacting with the electrical coil is strongest near the sidewalls 103, 105 of the first and second magnets. The efficiency of the loudspeaker can be optimized by locating as much of the electrical coil assembly where the magnetic field B is strongest, shown at 107 in FIG. 5. In implementations where there is a space between the housing sidewall 115 and sidewalls 103, 105 of the first and second magnets, as shown in FIGS. 1 and 3-5, an outer peripheral portion 134 of the electrical coil assembly extends beyond the gap and toward the housing sidewall. In FIG. 5, the sidewalls 103, 105 of the first and second magnets, where the radial component of the magnetic field is strongest, are more closely aligned with the radial difference dimension $R_{DIF}$ of the electrical coil assembly than with an outer perimeter 136 of the electrical coil assembly. In other implementations, the entirety of the electrical coil assembly is located in the gap between the first and second magnets. Such other implementations include but are not limited to loudspeakers where the sidewalls 103, 105 of the magnets extend to the inner sidewall 115 of the housing.

In some implementations, the loudspeaker comprises a spacer located between mating portions of the housing and spaced apart from an outer peripheral portion of the electrical coil assembly. The spacer can be made of brass or another metal, polymer, carbon fiber or epoxy saturated cellulose, among other materials. The spacer can be coupled to the diaphragm and dimensioned to more accurately locate the electrical coil assembly in the gap between the first and second magnets. For example, the spacer can be sized to center the electrical coil assembly between the magnets or to locate the coil assembly more near one magnet or the other. In one implementation, the spacer is fastened to and supports the peripheral ring of the diaphragm. In FIG. 5, a spacer 129 is disposed between the first and second portions of the housing. The spacer 129 also supports the diaphragm ring 126 between the mating housing portions. In other implementations, the diaphragm ring can be coupled to an inner perimeter of the spacer without the ring being clamped between the mating housing portions.

As described herein, the diaphragm can comprise all or portions of the electrical coil assembly. In FIG. 5, the diaphragm comprises the electrical coil assembly and the flexible surround 122 fastened to an outer peripheral portion of the electrical coil assembly 130 comprising a bobbin 133. In this implementation, the electrical coil assembly and the flexible surround separate the front volume from the back volume without the need for a membrane. Alternatively, the electrical coil assembly may be devoid of the bobbin and the diaphragm may include a membrane cover the opening about which the coil is wound after removal of the bobbin. The stiffness of the bobbin can also be selected to provide more or less resonances as specified frequencies, depending on requirements of the use case.

Figure 7:
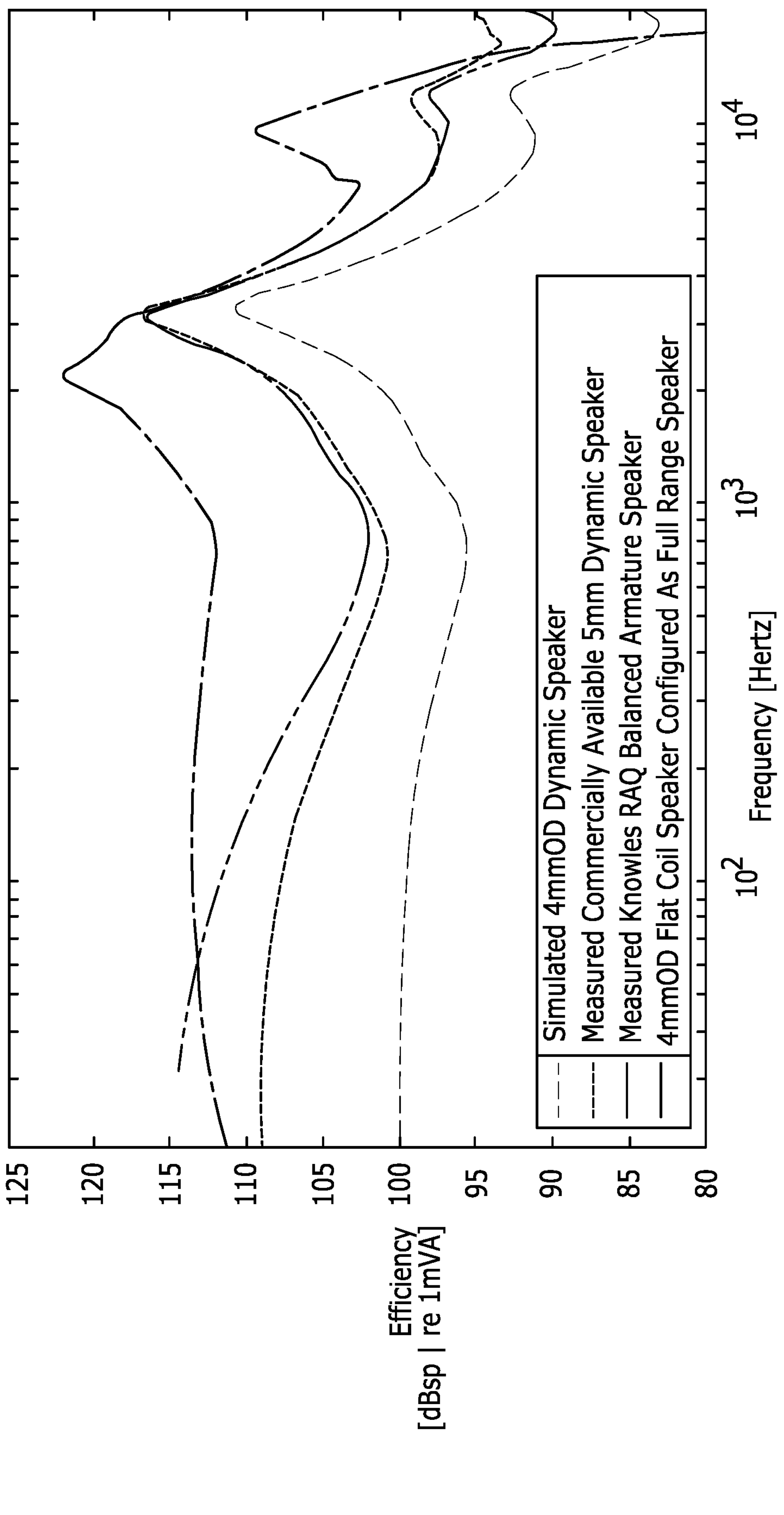
FIG. 7 show comparative plots of frequency versus efficiency for a flat-coil loudspeaker and other competitive speakers.

In FIG. 7, the graph plots measured and simulated transducer efficiency (dB SPL for a 1 mVA reference input signal) versus frequency for the flat-coil loudspeaker disclosed herein having a 4 mm outer diameter relative to several other comparable audio transducers. The flat-coil loudspeaker has much higher efficiency across the audio band in comparison to a dynamic speaker having a 4 mm outer diameter. The 4 mm flat-coil loudspeaker has similar efficiency relative to a commercially available dynamic speaker having a 5 mm outer diameter. Thus the flat-coil loudspeaker described herein achieves similar output in a smaller space. The efficiency of the 4 mm flat-coil loudspeaker is also compared to a Knowles RAQ balanced armature receiver having a comparable 4 mm cross sectional dimension, but the RAQ receiver has a much longer length of 5.32 mm compared to the 2.9 mm length of the 4 mm diameter flat-coil loudspeaker.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A wearable loudspeaker comprising:

a housing having a sound port;

a diaphragm disposed in the housing and separating an interior of the housing into a back volume and a front volume acoustically coupled to the sound port, a first magnet fastened to the housing and located in the front volume;

a second magnet fastened to the housing and located in the back volume, a surface of the first magnet facing an opposing surface of the second magnet, the opposing surfaces of the first and second magnets separated by a gap and having the same magnetic polarity;

an electrical coil assembly coupled to the diaphragm and located in the gap, the electrical coil assembly having a radial difference dimension and a thickness dimension, a ratio of the radial difference dimension to the thickness dimension greater than 1, a portion of the electrical coil assembly located in the gap between the first and second magnets, and an outer peripheral portion of the electrical coil assembly extending beyond the gap and toward a sidewall of the housing, wherein the diaphragm and the electrical coil assembly are movable in unison in the gap between the first and second magnets in response to an electrical audio signal applied to the electrical coil assembly.

2. The wearable loudspeaker of claim 1, the housing constitutes a DC magnetic circuit including the first and second magnets.

3. The wearable loudspeaker of claim 1 further comprising space between the sidewall of the housing and sidewalls of the first and second magnets, wherein the sidewalls of the first and second magnets are more closely aligned with the radial difference dimension of the electrical coil assembly than with an outer perimeter of the electrical coil assembly.

4. The wearable loudspeaker of claim 3, the housing constitutes part of a DC magnetic circuit including the first and second magnets, wherein the first and second magnets having sufficient magnetic field strength to provide a magnetic flux density greater than 1.5 Tesla in portions of the housing where the sidewalls of the first and second magnets meet the housing.

5. The wearable loudspeaker of claim 4, the first magnet fastened to a first housing endwall partially defining the front volume, and the second magnet fastened to a second housing endwall partially defining the back volume.

6. The wearable loudspeaker of claim 1, the housing is an assembly comprising a first housing portion to which the first magnet is fastened and a second housing portion to which the second magnet is fastened, the first and second magnets are aligned symmetrically with the electrical coil assembly.

7. The wearable loudspeaker of claim 6, the diaphragm further comprising a flexible surround and a ring disposed about and coupled to the flexible surround coupled to an inner sidewall of the housing.

8. The wearable loudspeaker of claim 7 further comprising a spacer located between the first and second housing portions, the spacer disposed about, and spaced apart from, an outer peripheral portion of the electrical coil assembly, the spacer coupled to the flexible surround and dimensioned to locate the electrical coil assembly in the gap between the first and second magnets.

9. A wearable loudspeaker comprising:

a housing having a sound port;

a diaphragm disposed in the housing and separating an interior of the housing into a back volume and a front volume coupled to the sound port, a first magnet fastened to a first endwall of the housing partially defining the front volume, a sidewall of the first magnet spaced apart from an inner sidewall of the housing;

a second magnet fastened to a second endwall, opposite the first endwall, of the housing partially defining the back volume, a sidewall of the second magnet spaced apart from the inner sidewall of the housing, opposing surfaces of the first and second magnets separated by a gap and having the same magnetic polarity, the first and second magnets having sufficient magnetic field strength to provide a magnetic flux density greater than 1.5 Tesla in portions of the housing where the sidewalls of the first and second magnets meet the first and second endwalls of the housing;

an electrical coil assembly fastened to the diaphragm and located in the gap, the electrical coil assembly having a radial difference dimension and a thickness dimension, a ratio of the radial difference dimension to the thickness dimension greater than 1;

wherein the diaphragm and the electrical coil assembly are movable in the gap between the first and second magnets in response to an electrical audio signal applied to the electrical coil assembly.

10. The wearable loudspeaker of claim 9, an inner radial portion of the electrical coil assembly located in the gap between the first and second magnets, and an outer peripheral portion of the electrical coil assembly extending beyond the gap and toward the inner sidewall of the housing.

11. The wearable loudspeaker of claim 10, wherein the sidewalls of the first and second magnets are more closely aligned with the radial difference dimension of the electrical coil assembly than with an outer perimeter of the electrical coil assembly.

12. The wearable loudspeaker of claim 9, the housing is an assembly comprising a first housing portion to which the first magnet is fastened and a second housing portion to which the second magnet is fastened, the first and second magnets are aligned symmetrically with the electrical coil assembly.

13. The wearable loudspeaker of claim 12 further comprising a spacer located between mating surfaces of the first and second housing portions, the spacer disposed about, and spaced apart from, an outer peripheral portion of the electrical coil assembly.

14. The wearable loudspeaker of claim 13, the diaphragm further comprising a membrane having an outer peripheral portion coupled to a flexible surround, wherein the flexible surround at least partially bridges space between the membrane and the inner sidewall of the housing.

15. The wearable loudspeaker of claim 14, the diaphragm further comprising a ring disposed about the flexible surround and coupled to the spacer, wherein the spacer is dimensioned to center the electrical coil assembly in the gap between the first and second magnets.

16. A wearable loudspeaker comprising:

a housing including first housing portion and a second housing portion;

a diaphragm disposed in the housing and separating an interior of the housing into a front volume partially defined by the first housing portion and a back volume partially defined by the second housing portion;

a first magnet fastened to the first housing portion and located in the front volume;

a second magnet fastened to the second housing portion and located in the back volume, opposing surfaces of the first and second magnets separated by a gap and having the same magnetic polarity;

an electrical coil assembly fastened to the diaphragm and located in the gap, the electrical coil assembly having a radial difference dimension and a thickness dimension, a ratio of the radial difference dimension to the thickness dimension greater than 1;

a spacer located between the first and second housing portions, the spacer disposed about, and spaced apart from, an outer peripheral portion of the electrical coil assembly, wherein the diaphragm and the electrical coil assembly are movable in the gap between the first and second magnets in response to an electrical audio signal applied to the electrical coil assembly.

17. The wearable loudspeaker of claim 16, the diaphragm further comprising a ring disposed about a flexible surround, the ring coupled to the spacer, wherein the spacer is dimensioned to locate the electrical coil assembly between the first and second magnets.

18. The wearable loudspeaker of claim 16 further comprising space located between a sidewall of the housing and sidewalls of the first and second magnets, wherein the sidewalls of the first and second magnets are more closely aligned with the radial difference dimension of the electrical coil assembly than with an outer perimeter of the electrical coil assembly.

19. The wearable loudspeaker of claim 18, an inner radial portion of the electrical coil assembly located in the gap between the first and second magnets, and an outer peripheral portion of the electrical coil assembly extending beyond the gap and into the space between the sidewall of the housing and the sidewalls of the first and second magnets.

20. The wearable loudspeaker of claim 19, the housing constitutes part of a DC magnetic circuit including the first and second magnets, wherein the first and second magnets having sufficient magnetic field strength to provide a magnetic flux density greater than 1.5 Tesla in portions of the housing where the sidewalls of the first and second magnets meet the housing.

* * * * *